HART & WASHBURN.
Car Wheel.
No. 6,269. Patented Apr. 3, 1849.
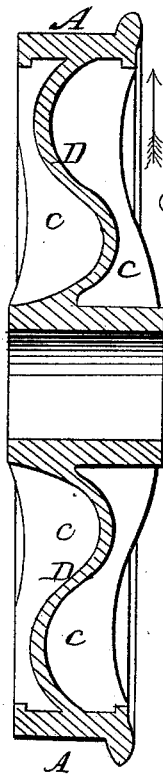
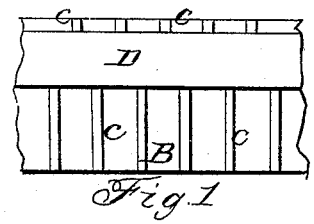
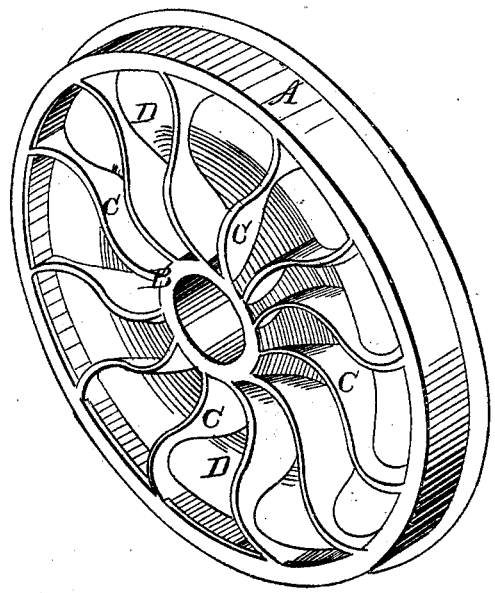

UNITED STATES PATENT OFFICE.

C. HART AND N. WASHBURN, OF ROCHESTER, NEW YORK.

CAST-IRON CAR-WHEEL.

Specification of Letters Patent No. 6,269, dated April 3, 1849.

*To all whom it may concern:*

Be it known that we, CARMI HART and NATHAN WASHBURN, of the city of Rochester and State of New York, have invented or produced a new and Improved Form of Railroad-Car Wheel; and we do hereby declare that the following is a full and exact description of the same.

Figure one (1) in the accompanying drawings is a section displaying the surface of the hub and the junction of the plate or flanches and arms or spokes with the same. Fig. two (2) is a similar section displaying the rim of the wheel on its inner side. Fig. three (3) is a section through the wheel in the plane of its axle. Fig. four (4) is a perspective view of the entire wheel.

Our wheel consists of a hub and rim connected by a series of curved spokes joined by flanches which form an entire plate all around the wheel; said plate being also curved in its radial section as will hereafter more fully appear.

In the drawing A represents the rim. B designates the hub; C, the arms which extend from the rim to the hub in a curve of an ogee form as clearly indicated in Fig. four (4). This form of the arms permits them to yield to any unequal shrinking to which the wheel may be subjected in cooling after it is cast. The flanches or plate D are joined to the center of the breadth of the arms. It has also an ogee curve laterally or in an opposite direction from that of the arms as is clearly indicated in Fig. three (3) which figure also indicates the expansion of the plate just at its junction with the rim and hub.

By the above combination of curved parts we are enabled to cast an iron wheel in one entire piece without strain or cracking, which is found so difficult in other wheels, when the connection between the hub and rim is made by the use of plates alone.

Having thus fully described our improvements in forming and constructing a solid cast iron wheel what we claim therein as new and for which we desire to secure Letters Patent is—

The combination herein described of arms and flanches or plate, said flanches or plate and arms being curved substantially in the manner and for the purposes set forth, reference being particularly made to the drawing for description.

CARMI HART.
NATHAN WASHBURN.

Witnesses:
D. C. HYDE,
H. R. DURNEY.